United States Patent
Bentley

(10) Patent No.: US 6,551,009 B2
(45) Date of Patent: Apr. 22, 2003

(54) SPLINE CONNECTION FOR LIMITED ACCESS SPACE AND METHOD OF ASSEMBLY AND DISASSEMBLY

(75) Inventor: David Todd Bentley, West Chester, OH (US)

(73) Assignee: General Electric Company, Schenectady, NY (US)

( * ) Notice: Subject to any disclaimer, the term of this patent is extended or adjusted under 35 U.S.C. 154(b) by 89 days.

(21) Appl. No.: 09/843,576

(22) Filed: Apr. 26, 2001

(65) Prior Publication Data

US 2002/0159827 A1 Oct. 31, 2002

(51) Int. Cl.[7] ................................................. B25G 3/28
(52) U.S. Cl. ................. 403/359.1; 403/182; 403/359.4; 403/359.5; 403/359.6; 74/405; 74/406; 29/893; 29/893.1
(58) Field of Search .............................. 403/182, 359.1, 403/359.4, 359.5, 359.6; 74/405, 406; 29/893, 893.1

(56) References Cited

U.S. PATENT DOCUMENTS

| | | | | |
|---|---|---|---|---|
| 2,508,832 A | * | 5/1950 | McAninch | |
| 3,631,688 A | * | 1/1972 | Quick | 403/359.5 |
| 4,357,137 A | * | 11/1982 | Brown | |
| 4,919,562 A | * | 4/1990 | Anthony et al. | |
| 4,926,972 A | * | 5/1990 | Yoshioka et al. | |
| 5,674,024 A | * | 10/1997 | Castellon | |
| 5,813,794 A | * | 9/1998 | Castellon | |
| 6,009,609 A | * | 1/2000 | Hanno | |
| 6,045,292 A | * | 4/2000 | Placide et al. | |
| 6,058,791 A | * | 5/2000 | Brunet | |
| 6,234,907 B1 | * | 5/2001 | Moser | 403/359.1 |
| 6,241,616 B1 | * | 6/2001 | Lightcap | 403/359.5 X |
| 6,386,983 B1 | * | 5/2002 | Sone et al. | |
| 6,428,236 B2 | * | 8/2002 | Aota et al. | 403/359.5 X |
| 2002/0023312 A1 | * | 2/2002 | Ritter et al. | |

FOREIGN PATENT DOCUMENTS

GB         2054100 A1 * 2/1981

* cited by examiner

*Primary Examiner*—Anthony Knight
*Assistant Examiner*—Ryan Flandro
(74) *Attorney, Agent, or Firm*—William Scott Andes; Pierce Atwood

(57) ABSTRACT

A spline connection is provided between a first part and a second part wherein a first set of internal splines is formed on an inner cylindrical surface of the first part and a second set of internal splines is formed on an inner cylindrical surface of the second part. Also included is a connector sleeve having first and second sets of external splines formed thereon. The connector sleeve is slideable between a pre-assembly position located fully within the second part and a fully assembled position in which a section of the connector sleeve is located in the first part and another section is located in the second part so that the first set of external splines engage the first set of internal splines and the second set of external spines engage the second set of internal splines.

19 Claims, 4 Drawing Sheets

SPLINE CONNECTION FOR LIMITED ACCESS SPACE AND METHOD OF ASSEMBLY AND DISASSEMBLY

BACKGROUND OF THE INVENTION

This invention relates generally to spline connections and more particularly to spline connections for applications with limited access space.

Spline connections are used in many devices for transmitting torque between two parts-such as a shaft and a hub or two shafts. Generally, a spline connection includes a series of internal splines formed on one of the parts engaging a series of external splines formed on the other of the two parts. The magnitude of the torque to be transmitted and the size of the two parts determine the length of the spline engagement (which is roughly equal to the amount of axial overlap of the parts).

Typically, a spline connection is assembled by positioning the two parts end-to-end lengthwise so that the internal splines are circumferentially aligned with the spaces between the external splines and then sliding the parts axially into overlapping engagement so that the two sets of splines become interdigitated with one another. The connection is disassembled by sliding the parts axially apart. With this approach, the access space required for assembly and disassembly of the parts is dependent on the spline engagement length. The greater the required spline engagement length is, the more access space is needed to accommodate the combined axial length of the parts when positioned end-to-end lengthwise during the assembly procedure. Additionally, special tooling is often required to provide for the proper alignment and force during assembly and disassembly, which in turn creates a need for increased access space. This approach requires that enough access space be available to allow the parts to be separated by a distance greater than the length of the spline engagement.

However, in many applications, sufficient access space is not available due to adjacent structure or other constraints. In such cases, conventional spline connections cannot be utilized. Accordingly, there is a need for a spline connection that can be assembled and disassembled in a limited amount of access space.

BRIEF SUMMARY OF THE INVENTION

The above-mentioned need is met by the present invention, which provides a spline connection between a first part and a second part wherein a first set of internal splines is formed on an inner cylindrical surface of the first part and a second set of internal splines is formed on an inner cylindrical surface of the second part. Also included is a connector sleeve having first and second sets of external splines formed thereon. The connector sleeve is slideable between a pre-assembly position located fully within the second part and a fully assembled position in which a section of the connector sleeve is located in the first part and another section is located in the second part so that the first set of external splines engage the first set of internal splines and the second set of external splines engage the second set of internal splines.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
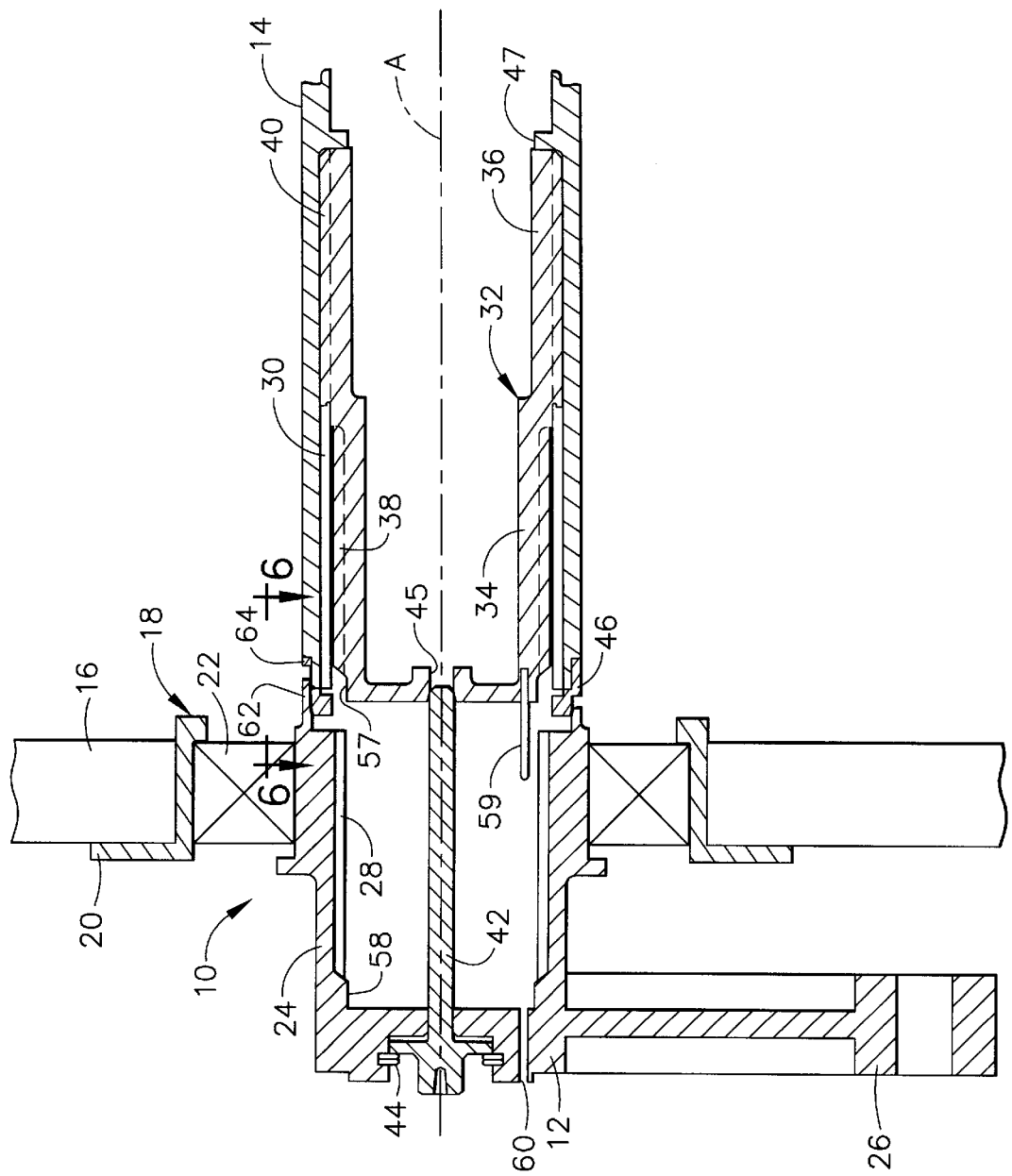
FIG. 1 is a cross-sectional view of a spline connection in a pre-assembly state.
Figure 2:
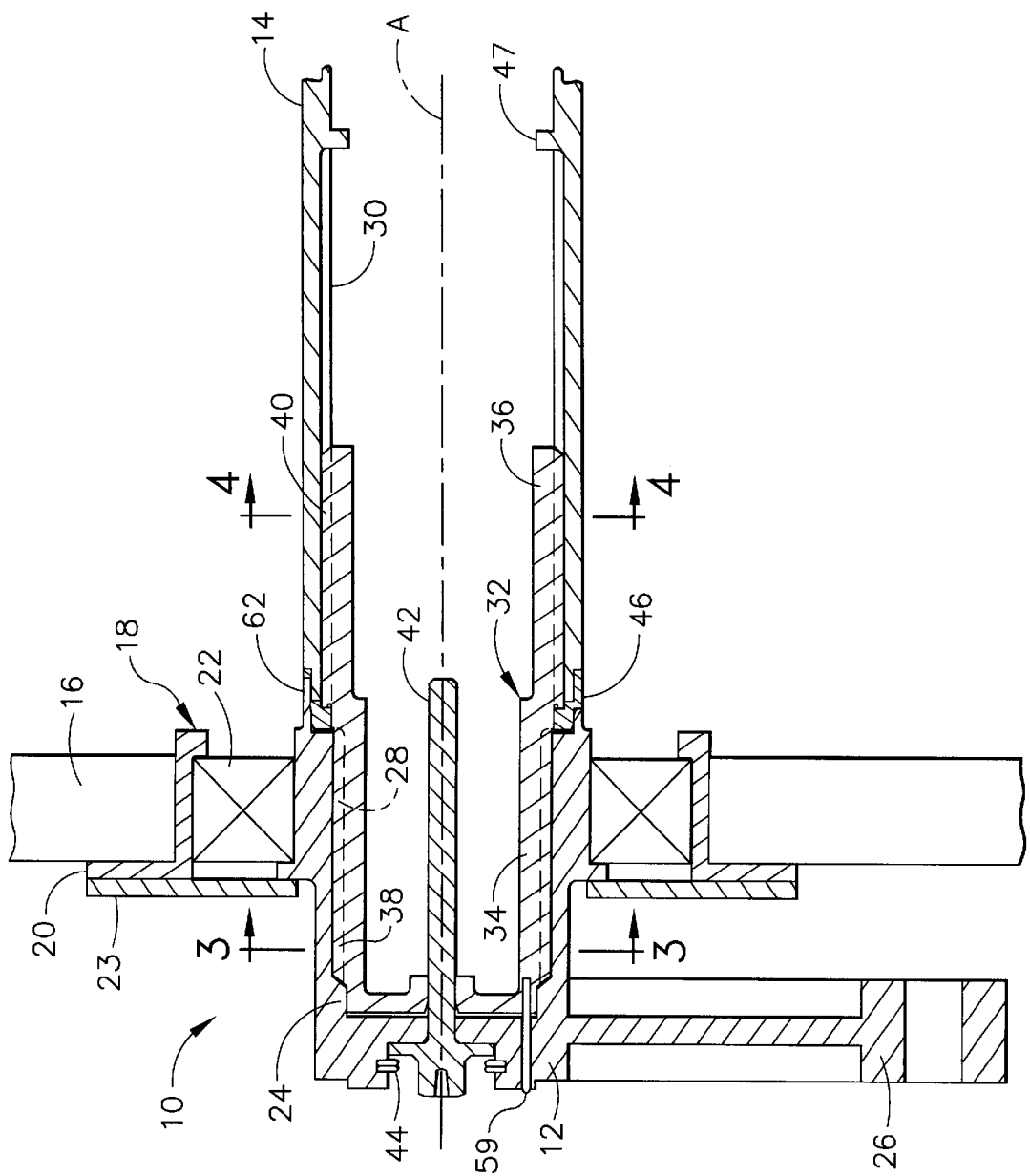
FIG. 2 is a cross-sectional view of the spline connection in a fully assembled state.

Referring to the drawings wherein identical reference numerals denote the same elements throughout the various views, FIGS. 1 and 2 show a spline connection 10 between a crank arm 12 and a shaft 14. FIG. 1 shows the spline connection 10 in a pre-assembled state, while FIG. 2 shows the spline connection 10 in its fully assembled state. In the illustrated exemplary embodiment, the shaft 14 is disposed within a casing 16 for rotation about its longitudinal axis A, and the crank arm 12 is located outside of the casing 16. Specifically, the crank arm 12 is mounted in a bearing assembly 18 located in the casing wall. The bearing assembly 18 includes a bearing housing 20 secured in an opening in the casing wall and a bearing 22 enclosed therein. An annular retaining plate 23 (FIG. 2) overlaps a radial lip on the crank arm 12 and is attached to the bearing housing 20 for retaining the crank arm 12 in the bearing assembly 18. While the drawings depict a spline connection comprising a crank arm and shaft, it should be noted that the present invention could be applied to other combinations of parts, such as two shafts.

The crank arm 12 includes a cylindrical hub portion 24 arranged coaxially with the shaft 14. The hub portion 24 has an open rear end that is received in the bearing assembly 18 and a closed front end that is disposed outside of the casing 16. As used herein, the end of the spline connection 10 that is located outside of the casing 16 (on the left in FIGS. 1 and 2) will be referred to as the "front," and the end of the spline connection 10 that is located inside of the casing 16 (on the right in FIGS. 1 and 2) will be referred to as the "rear." An arm portion 26 extends radially outward from the closed end of the hub portion 24. The hub portion 24 has an outer cylindrical surface that engages the bearing 22 and an inner cylindrical surface that defines a hollow interior. A first set of internal splines 28 is circumferentially disposed on the hub portion inner cylindrical surface. The front end of the shaft 14 is disposed adjacent to the rear end of the hub portion 24. The shaft 14 includes an inner cylindrical surface defining a hollow interior, and a second set of internal splines 30 is circumferentially disposed on the inner cylindrical surface at the front end of the shaft 14. The inner cylindrical surface of the shaft 14 is slightly larger in diameter than the inner cylindrical surface of the hub portion 24.

Figure 4:
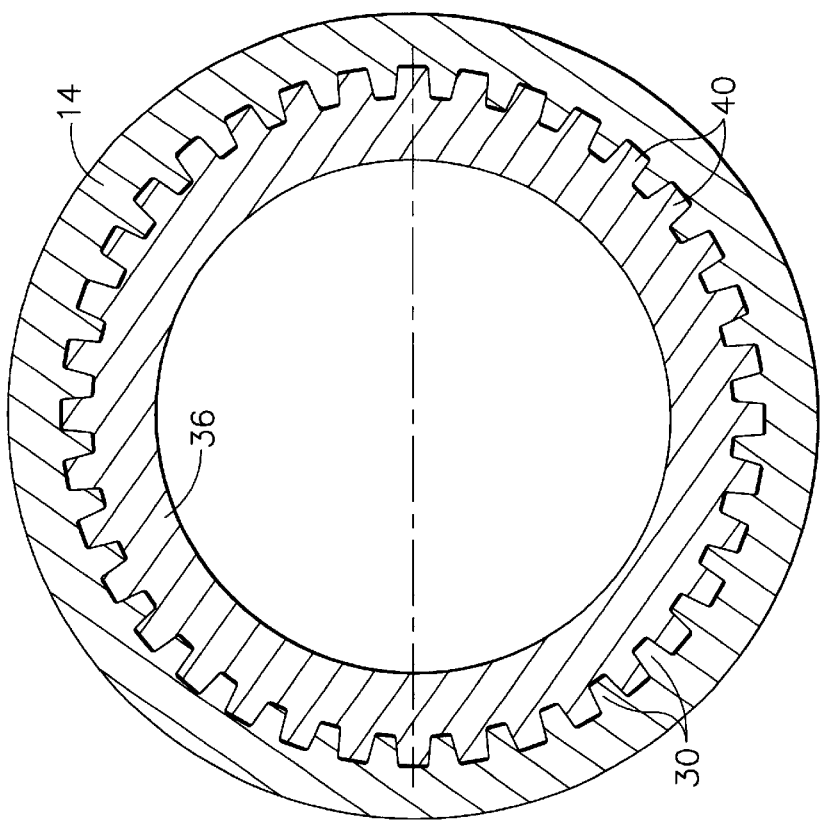
FIG. 4 is sectional view of the spline connection taken along line 4—4 of FIG. 2.
Figure 3:
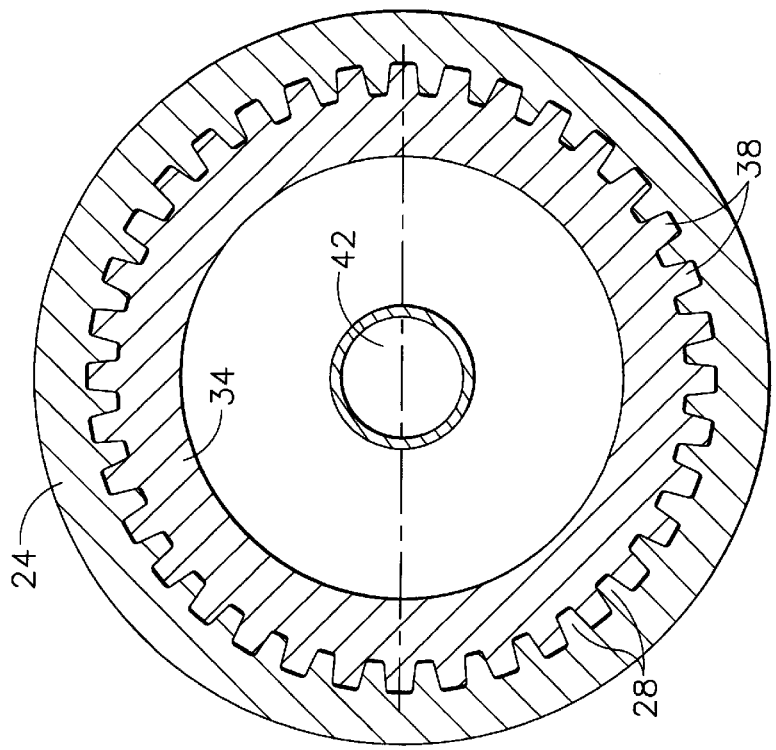
FIG. 3 is sectional view of the spline connection taken along line 3—3 of FIG. 2.

A connector sleeve 32 is provided for transmitting torque from the crank arm 12 to the shaft 14. The connector sleeve 32 comprises first and second cylindrical sections 34 and 36 that are arranged coaxially. The axial lengths of the two sections 34, 36 will be dictated by design requirements and are not necessarily equal. The first cylindrical section 34 has a closed front end and is joined at an open rear end to the front end of the second section 36. Both sections 34, 36 of the connector sleeve 32 define outer cylindrical surfaces, with the second section 36 being slightly larger in diameter than the first section 34. A first set of external splines 38 is circumferentially disposed on the outer cylindrical surface of the first section 34, and a second set of external splines 40 is circumferentially disposed on the outer cylindrical surface of the second section 36. The first section 34 has its outer diameter sized to be received within the hollow interior of the hub portion 24, and the second section 36 has its outer diameter sized to be received within the hollow interior of the shaft 14. Thus, when the spline connection 10 is fully assembled, the first external spines 38 mesh with the first internal splines 28 (shown best in FIG. 3), and the second external splines 40 mesh with the second internal splines 30 (shown best in FIG. 4). Accordingly, torque is transmitted from the crank arm 12 to the connector sleeve 32 via the first internal and external splines 28, 38 and from the connector sleeve 32 to the shaft 14 via the second internal and external splines 40, 30.

The splines 28, 30, 38, 40 are all axially extending members that permit relative sliding in the axial direction. Thus, the connector sleeve 32 is able to slide axially with respect to both the shaft 14 and the hub portion 24 of the crank arm 12. Specifically, the connector sleeve 32 can translate between two positions: the pre-assembly position shown in FIG. 1 and the fully assembled position shown in FIG. 2. In the pre-assembly position, the connector sleeve 32 is fully contained within the shaft 14. This allows the crank arm 12 and/or the shaft 14 to be installed or removed from the casing 16 with a minimal amount of access space. In the fully assembled position, the first sleeve section 34 is disposed inside the hub portion 24 and the second sleeve section 36 is disposed within the shaft 14 such that the corresponding sets of splines mesh.

To accommodate this sliding motion, the second internal splines 30 formed on the inner cylindrical surface of the shaft 14 have an axial length that is greater than or equal to the axial length of the connector sleeve 32. The first internal splines 28 have an axial length approximately equal to that of the first external splines 38. With this arrangement, the assembled spline connection 10 provides a spline engagement length equal to the combined axial lengths of the first and second external splines 38, 40.

The axial movement of the connector sleeve 32 is produced by a threaded bolt 42 that is rotatively mounted in the crank arm 12. Specifically, the bolt 42 is received within an opening that is formed in the closed front end of the cylindrical hub portion 24, on the longitudinal axis A. A retaining ring 44 (such as a snap ring or the like) is provided for retaining the bolt 42 in the crank arm opening. The bolt 42 extends the entire length of the hub portion 24 so as to protrude slightly beyond the rear end thereof. The bolt 42 threadingly engages a threaded hole 45 (FIG. 1) formed in the closed front end of the connector sleeve 32. Thus, turning the bolt 42 in one direction will cause the connector sleeve 32 to slide axially frontward with respect to the shaft 14, and turning the bolt 42 in the other direction will cause the connector sleeve 32 to slide axially rearward with respect to the shaft 14. An annular shoulder 47 formed on the inner surface of the shaft 14, at the rear of the second internal splines 30, limits the rearward motion of the connector sleeve 32.

Figure 5:
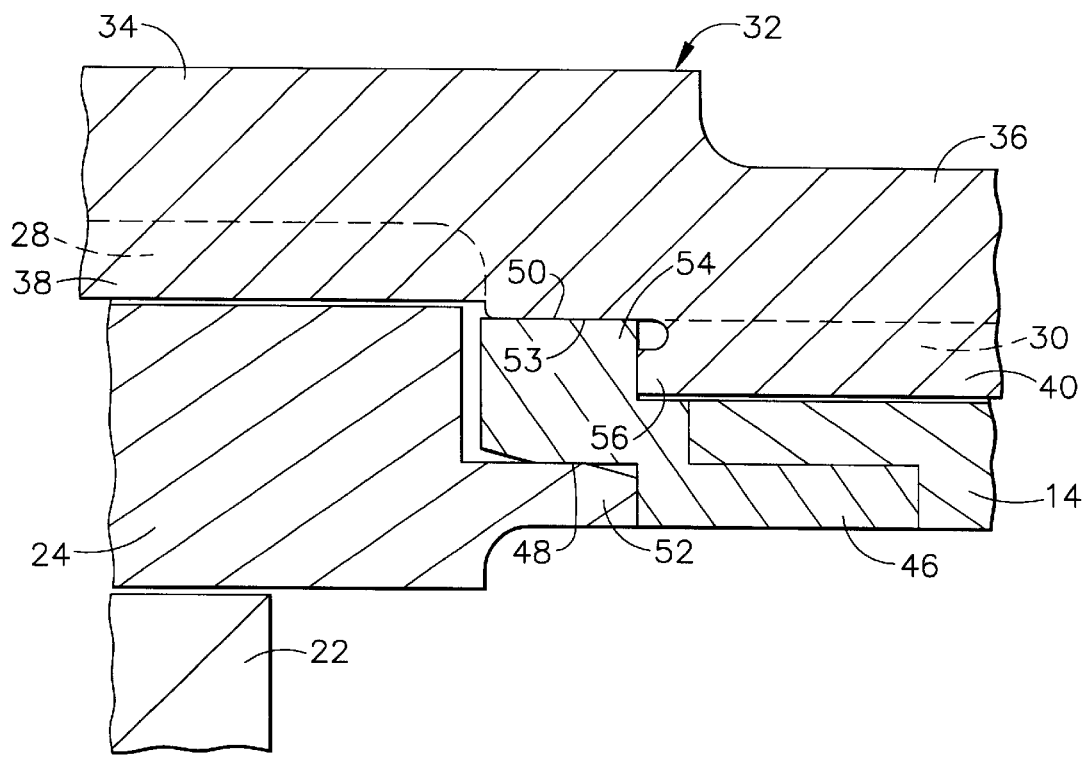
FIG. 5 is an enlarged, detailed view of a portion of the spline connection of FIG. 2.

A sleeve retainer nut 46 is attached to the front end of the shaft 14. In one embodiment, the sleeve retainer nut 46 is threaded onto the shaft 14, although other means of attachment can be used. The sleeve retainer nut 46 serves many functions. It prevents the connector sleeve 32 from sliding out of the shaft 14 during pre-assembly handling. The retainer nut 46 also positions the shaft 14 coaxially with the hub portion 24. When the spline connection is fully assembled, the retainer nut 46 positions the connector sleeve 32 coaxially with the shaft 14 and axially retains the connector sleeve 32, thereby providing for axial clamping between the hub portion 24 and the shaft 14. This is best shown referring to FIG. 5, which shows an enlarged view of the sleeve retainer nut 46 in its assembled position. The sleeve retainer nut 46 defines radially outer and inner annular abutment surfaces 48 and 50, respectively. The outer abutment surface 48 engages an annular flange 52 that protrudes axially from the rear end of the hub portion 24. This establishes a rabbet joint between the shaft 14 (via the sleeve retainer nut 46) and the hub portion 24 that coaxially positions the crank arm 12 and the shaft 14. The inner abutment surface 50 engages a corresponding annular abutment surface 53 formed on the outer surface of the connector sleeve 32, at the juncture of the first and second sleeve sections 34, 36. This establishes a rabbet joint between the shaft 14 (via the sleeve retainer nut 46) and the connector sleeve 32 that coaxially positions the connector sleeve 32 and the shaft 14. The sleeve retainer nut 46 also includes an axially facing shoulder 54 that engages an axially facing lip 56 on the connector sleeve 32 for axially retaining the connector sleeve 32 in the shaft 14, and thereby provides for axial clamping between the hub portion 24 and the shaft 14.

Referring again to FIGS. 1 and 2, a rabbet joint is established between the connector sleeve 32 and the crank arm 12 for coaxially positioning these two elements when the spline connection 10 is fully engaged. This rabbet joint is defined by a radially outer annular abutment surface 57 formed on the front end of the first sleeve section 34 and a radially inner annular abutment surface 58 formed on the inner surface of the hub portion 24, near the closed front end thereof. An engagement indicator pin 59 protrudes axially from the front end of the connector sleeve 32 and is received in a pin hole 60 formed in the closed end of the crank arm hub portion 24. Thus, full engagement of the spline connection 10 and all three rabbet joints is verified when the indicator pin 59 protrudes through the pin hole 60 so as to be visible from the outside of the crank arm 12. An alternative arrangement would be to have a spring-loaded indicator pin mounted in the pin hole 60 so as to protrude into the interior of the hub portion 24. Then when the spline connection 10 is fully assembled, the connector sleeve 32 would engage the indicator pin and cause it protrude through the other side of the pin hole 60 and be visible from the outside of the crank arm 12.

Figure 6:
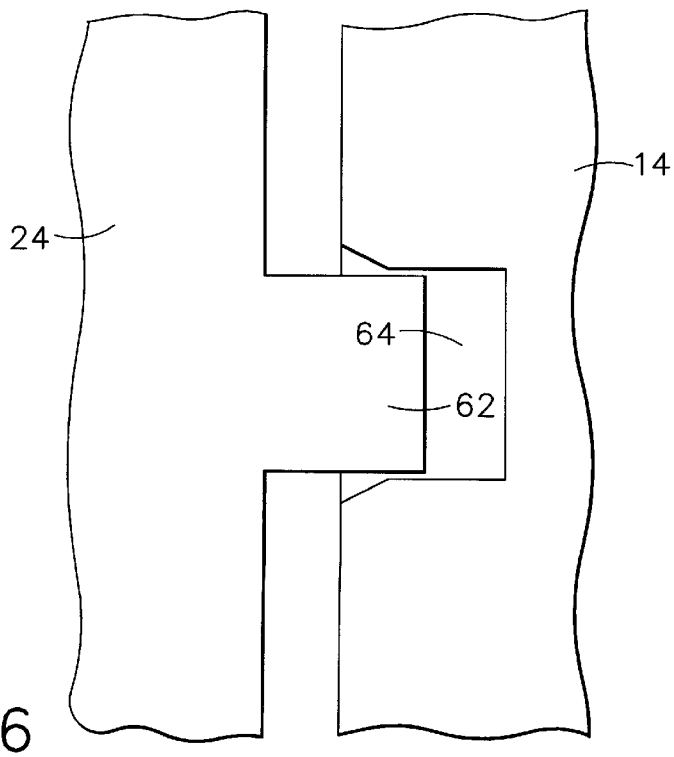
FIG. 6 is a view of the spline connection taken along line 6—6 of FIG. 1.

Referring now to FIG. 6, it is seen that an alignment tab 62 protrudes axially from the rear of the hub portion 24. A correspondingly sized slot 64 is formed in the outer surface of the shaft 14 (or possibly the sleeve retainer nut 46), at the front end thereof for receiving the tab 62 when the spline connection is fully engaged. The tab 62 and slot 64 are circumferentially located on the hub portion 24 and the shaft 14, respectively, such that engagement of the tab 62 into the slot 64 ensures proper circumferential alignment of the intermeshing splines. Additionally, the alignment tab 62 extends farther axially rearward than the bolt 42, which ensures that the tab 62 engages the slot 64 before the bolt 42 can engage the threaded hole 45. It should be noted that other clocking arrangements for preventing spline interference could be used as an alternative to the abovedescribed tab-slot approach.

Referring again to FIGS. 1 and 2, a method for assembling the spline connection 10 is described. The threaded bolt 42 is mounted in the crank arm 12 by inserting it into the opening that is formed in the closed front end of the cylindrical hub portion 24 and installing the retaining ring 44 for retaining the bolt 42 during handling of the crank arm 12. The retaining ring 44 also facilitates disassembly of the spline connection 10, as will be described below. The connector sleeve 32 is placed fully within the hollow interior of the shaft 14, with the second external splines 40 slidingly engaging the second internal splines 30 of the shaft 14. The first external splines 38 fit freely within the shaft interior due to the smaller diameter of the first sleeve section 34. The sleeve retainer nut 46 is then attached to the front end of the shaft 14 to retain the sleeve 32 for handling purposes. The shaft 14, with connector sleeve 32 contained therein, is installed in position within the casing 16. Typically, the shaft 14 will be restrained from moving any significant amount in either the frontward or rearward directions.

With the shaft 14 in position, the crank arm 12 is installed into the bearing assembly 18 with the rear end of the hub portion 24 initially positioned with respect to the front end of the shaft 14 through the lead-in of the rabbet joint between the sleeve retainer nut 46 and the hub portion 24. The crank arm 12 is circumferentially positioned so that the alignment tab 62 is received within the slot 64 in the shaft 14. At this point, the bolt 42 initially engages the threaded hole 45 of the connector sleeve 32 as shown in FIG. 1. The assembly then proceeds by turning the bolt 42 so that the crank arm 12 is forced rearward, toward the shaft 14, and the connector sleeve 32 is forced frontward so that the first sleeve section 34 is moved axailly into the hollow interior of the hub portion 24. The first external splines 38 mesh with the first internal splines 28 without interference due to the circumferential alignment provided by the tab 62 and the slot 64. The second external splines 40 remain in engagement with the second internal splines 30. The bolt 42 is continued to be turned until the first sleeve section 34 becomes fully engaged within the hub portion 24, along with full engagement of all of the rabbet joints, as shown in FIG. 2.

At this point, the spline connection 10 is fully engaged, with the crank arm 12 and the shaft 14 being fully clamped together near the location of the rabbet joint between the sleeve retainer nut 46 and the annular flange 52 protruding axially from the rear end of the hub portion 24. Furthermore, the connector sleeve 32 axially loads against the retainer nut shoulder 54, thereby allowing the crank arm 12 and the shaft 14 to become fully clamped. The desired clamping force is achieved through the properly applied torque on the bolt 42. The indicator pin 59 protruding through the pin hole 60 verifies the full engagement of the spline connection 10. Mounting the retaining plate 23 to the bearing housing 20, thereby retaining the crank arm 12 completes the assembly process.

To disassemble the spline connection 10, the bolt 42 is turned in the opposite direction, which forces the connector sleeve 32 rearward, out of and away from the hub portion 24. The bolt 42 is turned in this direction until the connector sleeve 32 is positioned fully inside the shaft 14 and is axially loaded against the shaft shoulder 47. At this point, the retaining plate 23 is removed from the bearing housing 20. The turning of the bolt 42 is then continued until the rabbet joint defined by the outer abutment surface 48 and the annular flange 52 is disengaged, thereby allowing the crank arm 12 to be removed from the bearing assembly 18. The retaining plate 23 is preferably not removed until after the connector sleeve 32 is fully positioned inside the shaft 14 in the event that the spline connection 10 becomes bound-up during the disassembly process. If the splines bind during disassembly, turning the bolt 42 would tend to force the crank arm 12 frontward before the connector sleeve 32 is fully positioned inside the shaft 14. This is undesirable because having the connector sleeve 32 fully contained within the shaft 14 allows the shaft 14 to be removed with a minimal amount of access space. The retaining plate 23 will prevent the crank arm 12 from moving forward prematurely due to spline binding. Similarly, the retaining ring 44 will prevent the bolt 42 from moving forward in the event of spline binding during disassembly.

The foregoing has described a spline connection that utilizes a sliding connector sleeve to allow assembly and disassembly in a limited amount of access space. While specific embodiments of the present invention have been described, it will be apparent to those skilled in the art that various modifications thereto can be made without departing from the spirit and scope of the invention as defined in the appended claims.

What is claimed is:

1. A spline connection comprising:
    a first part defining an inner cylindrical surface having a first set of internal splines formed thereon;
    a second part defining an inner cylindrical surface having a second set of internal splines formed thereon;
    a connector sleeve having first and second sets of external splines formed thereon, said first set of external splines engaging said first set of internal splines and said second set of external splines engaging said second set of internal splines; and
    a threaded bolt rotatively mounted on said first part and threadingly engaging said connector sleeve, whereby rotation of said threaded bolt causes said connector sleeve to slide with respect to said first and second parts.

2. The spline connection of claim 1 wherein said second internal splines are greater than or equal in length to said first and second external splines combined.

3. The spline connection of claim 1 wherein the length of said second internal splines is greater than or equal to the length of said connector sleeve.

4. The spline connection of claim 1 wherein said connector sleeve includes a first cylindrical section having said first external splines formed thereon and a second cylindrical section having said second external splines formed thereon, said second cylindrical section being slightly larger in diameter than said first cylindrical section.

5. The spline connection of claim 4 wherein said first cylindrical section is disposed in said first part and second cylindrical section is disposed in said second part.

6. The spline connection of claim 1 further comprising a rabbet joint between said first part and said second part, a rabbet joint between said first part and said connector sleeve, and a rabbet joint between said second part and said connector sleeve.

7. A spline connection comprising:
    a first part having an inner cylindrical surface that defines a hollow interior;
    a first set of internal splines formed on said inner cylindrical surface of said first part;
    a second part having an inner cylindrical surface that defines a hollow interior;

a second set of internal splines formed on said inner cylindrical surface of said second part;

a connector sleeve having first and second sets of external splines formed thereon, said connector sleeve being slidable between a first position located fully within said hollow interior of said second part and a second position in which said first set of external splines engage said first set of internal splines and said second set of external splines engage said second set of internal splines; and a threaded bolt rotatively mounted on said first part and threadingly engaging said connector sleeve, whereby rotation of said threaded bolt causes said connector sleeve to slide between said first and second positions.

8. The spline connection of claim 7 further comprising a tab formed on said first part and a slot formed in said second part, wherein said first internal splines and said first external splines are circumferentially aligned when said tab is received in said slot.

9. The spline connection of claim 8 wherein said tab extends farther axially than said threaded bolt.

10. The spline connection of claim 7 wherein said second internal splines are greater than or equal in length to said first and second external splines combined.

11. The spline connection of claim 7 wherein the length of said second internal splines is greater than or equal to the length of said connector sleeve.

12. The spline connection of claim 7 wherein said connector sleeve includes a first cylindrical section having said first external splines formed thereon and a second cylindrical section having said second external splines formed thereon, said second cylindrical section being slightly larger in diameter than said first cylindrical section.

13. The spline connection of claim 12 wherein said hollow interior of said first part is slightly larger in diameter than said hollow interior of said second part so that said first cylindrical section is received within said hollow interior of said first part and said second cylindrical section is received within said hollow interior of said second part when said connector sleeve is in said second position.

14. The spline connection of claim 13 further comprising a sleeve retainer nut attached to one end of said second part, said sleeve retainer nut having a first abutment surface that defines a rabbet joint with said first part when said connector sleeve is in said second position and a second abutment surface that defines a rabbet joint with said connector sleeve when said connector sleeve is in said second position.

15. The spline connection of claim 14 further comprising a rabbet joint between said first part and said connector sleeve when said connector sleeve is in said second position.

16. The spline connection of claim 7 further comprising an indicator pin protruding from said connector sleeve and a hole formed in said first part, wherein said indicator pin is received in said hole when said connector sleeve is in said second position.

17. A method of assembling a spline connection between a first part having a first set of internal splines formed thereon and a second part having a second set of internal splines formed thereon, said method comprising:

providing a connector sleeve having first and second sets of external splines formed thereon;

placing said connector sleeve fully within said second part with said second internal splines engaging said second external splines;

locating one end of said first part adjacent to one end of said second part; and sliding said connector sleeve with respect to said first and second parts so that a portion of said connector sleeve is moved into said first part with said first internal splines engaging said first external splines.

18. The method of claim 17 wherein sliding said connector sleeve is accomplished with a threaded bolt rotatively mounted in said first part.

19. The method of claim 17 further comprising circumferentially aligning said first and second parts prior to sliding said connector sleeve so that said first internal splines will properly mesh with said first external splines.

* * * * *